(12) United States Patent
Sung et al.

(10) Patent No.: US 9,507,669 B2
(45) Date of Patent: Nov. 29, 2016

(54) METHOD OF TRANSMITTING DATA USING HARQ

(75) Inventors: Doo Hyun Sung, Anyang-si (KR); Hyung Ho Park, Anyang-si (KR); Jin Soo Choi, Anyang-si (KR); Jae Hoon Chung, Anyang-si (KR); Jong Young Han, Anyang-si (KR); Kyu Jin Park, Anyang-si (KR); Eun Jong Lee, Anyang-si (KR); Han Gyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1494 days.

(21) Appl. No.: 12/445,553

(22) PCT Filed: Jul. 21, 2008

(86) PCT No.: PCT/KR2008/004236
§ 371 (c)(1),
(2), (4) Date: May 7, 2009

(87) PCT Pub. No.: WO2009/064059
PCT Pub. Date: May 22, 2009

(65) Prior Publication Data
US 2010/0257419 A1    Oct. 7, 2010

(30) Foreign Application Priority Data

Nov. 15, 2007  (KR) .................. 10-2007-0116846
Jan. 10, 2008  (KR) .................. 10-2008-0003030
Mar. 13, 2008  (KR) .................. 10-2008-0023453

(51) Int. Cl.
*G06F 11/14*    (2006.01)
*H04L 1/18*    (2006.01)
(Continued)

(52) U.S. Cl.
CPC ......... *G06F 11/1443* (2013.01); *H04L 1/1607* (2013.01); *H04L 1/1812* (2013.01);
(Continued)

(58) Field of Classification Search
CPC . H04L 1/1887; H04L 1/1812; H04L 1/1861; H04L 5/0055; H04L 5/001
USPC ........................................... 714/748
See application file for complete search history.

(56) References Cited

U.S. PATENT DOCUMENTS

2004/0223507 A1    11/2004 Kuchibhotla et al.
2006/0258364 A1*   11/2006 Usuda et al. ................ 455/450
(Continued)

FOREIGN PATENT DOCUMENTS

EP    1 855 411 A2    11/2007
EP    1855410 A2    11/2007
(Continued)

OTHER PUBLICATIONS

3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V1.0.0 (Sep. 2007), pp. 1-3.
(Continued)

*Primary Examiner* — Jigar Patel
(74) *Attorney, Agent, or Firm* — Birch, Stewart, Kolasch & Birch, LLP (57) ABSTRACT

A method of data transmission using HARQ is provided. The method includes transmitting an uplink data, receiving an ACK/NACK signal for the uplink data, keeping the uplink data in a HARQ buffer when the ACK/NACK signal is an ACK signal, and retransmitting the uplink data when an uplink scheduling information for retransmission of the uplink data is received. In the present invention, a transmission error in an ACK/NACK signal is promptly detected, and thus data can be transmitted at a high speed.

18 Claims, 7 Drawing Sheets (51) Int. Cl.
 *H04L 1/16* (2006.01)
 *H04L 1/12* (2006.01)

(52) U.S. Cl.
 CPC .......... *H04L1/1829* (2013.01); *H04L 1/1874* (2013.01); *H04L 1/1887* (2013.01); *H04L 1/1896* (2013.01); *H04L 1/1822* (2013.01); *H04L 2001/125* (2013.01)

(56) References Cited

U.S. PATENT DOCUMENTS

| | | | |
|---|---|---|---|
| 2007/0223526 A1* | 9/2007 | Jiang | 370/468 |
| 2007/0300120 A1* | 12/2007 | Kim et al. | 714/749 |
| 2008/0045255 A1* | 2/2008 | Revel et al. | 455/510 |
| 2008/0310389 A1* | 12/2008 | Suzuki et al. | 370/346 |
| 2010/0235705 A1* | 9/2010 | Kim et al. | 714/749 |

FOREIGN PATENT DOCUMENTS

| | | |
|---|---|---|
| KR | 10-2007-0099379 A | 10/2007 |
| KR | 10-2007-0108300 A | 11/2007 |
| KR | 10-2007-0108801 A | 11/2007 |

OTHER PUBLICATIONS

LG Electronics, On the UE behaviour related to UL synchronous HARQ procedure, Discussion and Decision, 3GPP TSG RAN WG1 #51, Jeju, Korea, Nov. 5-9, 2007, R1-074748, pp. 1-6.

Panasonic, "UL HARQ behaviour with dynamic adaptive/non-adaptive operation", Discussion and Decision, 3GPP TSG-RAN WG2 Meeting #60, Jeju, Korea, Nov. 5-9, 2007, R2-074854(R1-07xxxx), pp. 1-4.

Alcate-Lucent, "ULAM Data Confirmation Based on HARQ ACK in LTE," 3GPP TSG RAN WG2 #59-bis, Agenda Item 4.10, R2-074353, Shanghai, China, Oct. 8-12, 2007, 5 pages.

Ericsson, "HARQ-ARQ Interactions," 3GPP TSG-RAN WG2 Ad-Hoc on LTE, Agenda Item 14, Tdoc R2-061861, Cannes, France, Jun. 27-30, 2006, 7 pages.

Nokia Corporation et al,. "UL HARQ and PHICH," 3GPP TSG-RAN WG2 Meeting #60, Agenda Item 5.1.1.3, R2-074671/R2-073911, Jeju, South Korea, Nov. 5-9, 2007, 3 pages.

Panasonic, "UL HARQ Behaviour with Dynamic Adaptive/Non-Adaptive Operation," 3GPP TSG-RAN WG1 Meeting #51, Agenda Item 6.4.6, R1-074928(R2-074854), Jeju, Korea, Nov. 5-9, 2007, 4 pages.

* cited by examiner

METHOD OF TRANSMITTING DATA USING HARQ

TECHNICAL FIELD

The present invention relates to wireless communication, and more specifically, to a method of transmitting data using HARQ.

BACKGROUND ART

Next generation mobile communication systems are standardized aiming at efficiently connecting to wired and wireless communication networks and providing integrated services, rather than being limited to providing simple radio communication services like previous generation mobile communication systems. Along with such demands for high-speed high-capacity communication systems capable of processing and transmitting a variety of information such as images, wireless data, and the like, there is required the development of techniques for transmitting a large volume of data close to the capacity of a wired communication network through a wireless communication network, getting out of voice-oriented services.

In an Automatic Repeat reQuest (ARQ) scheme, when a receiver successfully receives data, it transmits an acknowledgement (ACK) to a transmitter so that the transmitter may transmit new data. Contrarily, when the receiver does not normally receive data, the receiver transmits a not-acknowledgement (NACK) to the transmitter so that the transmitter may retransmit the data.

Recently, a Hybrid-ARQ (HARQ) scheme, which is a technique combining an existing ARQ scheme with channel coding of a physical layer, is proposed to improve transmission efficiency when data is processed. In the HARQ scheme, since data transmission errors are processed in the physical layer, the errors can be further promptly corrected as compared with the ARQ scheme in which the errors are processed in a higher layer. Therefore, the HARQ scheme is suitable for high-speed data transmission, and for this reason, the HARQ scheme is an important technique adopted in fourth generation communication systems.

Downlink means a communication from a base station to a user equipment, and uplink means a communication from the user equipment to the base station. In the downlink, a transmitter may be a part of the base station, and a receiver may be a part of the user equipment. In the uplink, a transmitter may be a part of the user equipment, and a receiver may be a part of the base station. Hereinafter, data transmitted in a HARQ scheme is referred to as HARQ data, and data transmitted in an ARQ scheme is referred to as ARQ data.

HARQ is performed by at least one HARQ entity existing in the user equipment or the base station. The HARQ entity allows transmission of data to be continuously processed while waiting for a feedback (an ACK or NACK signal) for a successful or unsuccessful reception with respect to transmission of immediately previous data.

In uplink transmission, if the user equipment receives resource assignment from the base station and indicates associated HARQ information to the HARQ entity, the HARQ entity performs a HARQ process indicated by the HARQ information. In the user equipment, a plurality of parallel HARQ processes may be used to support the HARQ entity.

The transmitter transmits HARQ data to the receiver, and the receiver transmits an ACK/NACK signal to the transmitter. If the transmitter receives an ACK signal from the receiver, the transmitter transmits new HARQ data. Contrarily, if the transmitter receives a NACK signal from the receiver, the transmitter retransmits the previously transmitted HARQ data. If the transmitter receives a NACK signal again, the transmitter retransmits the previously transmitted HARQ data as many times as a maximum number of retransmission.

Due to degradation in channel conditions, an error may occur in the ACK/NACK signal such that the transmitter receives a NACK signal although the receiver transmits an ACK signal (this is called as an ACK-TO-NACK error), or contrarily, the transmitter receives an ACK signal although the receiver transmits a NACK signal (this is called as a NACK-TO-ACK error). In the case of the ACK-TO-NACK error, since the transmitter retransmits the data although the receiver has successfully received the data, only the data is duplicated, but not lost. However, in the case of the NACK-TO-ACK error, since the transmitter transmits new data without retransmitting the previous data although the receiver has failed to receive the previous data, there is a problem of losing the data.

Therefore, required is a method of transmitting data using HARQ, which can reduce loss of data invited by an error in the ACK/NACK signal.

DISCLOSURE

Technical Problem

Accordingly, the present invention has been made in order to solve the above problems, and it is an object of the invention to provide a method of transmitting data using HARQ.

Technical Solution

According to an aspect of the present invention, a method of data transmission using HARQ is provided. The method includes transmitting an uplink data, receiving an ACK/NACK signal for the uplink data, keeping the uplink data in a HARQ buffer when the ACK/NACK signal is an ACK signal, and retransmitting the uplink data when an uplink scheduling information for retransmission of the uplink data is received.

According to another aspect of the present invention, a method of data transmission using HARQ is provided. The method includes transmitting an uplink data, receiving an ACK/NACK signal for the uplink data, keeping the uplink data in a HARQ buffer after receiving the ACK/NACK signal, and suspending retransmission of the uplink data if the ACK/NACK signal is an ACK signal and no uplink scheduling information is received, and retransmitting the uplink data if the ACK/NACK signal is a NACK signal and no uplink scheduling information is received.

Advantageous Effects

In the present invention, a transmission error in an ACK/NACK signal is promptly detected, and thus data can be transmitted at a high speed.

MODE FOR INVENTION

Figure 1:
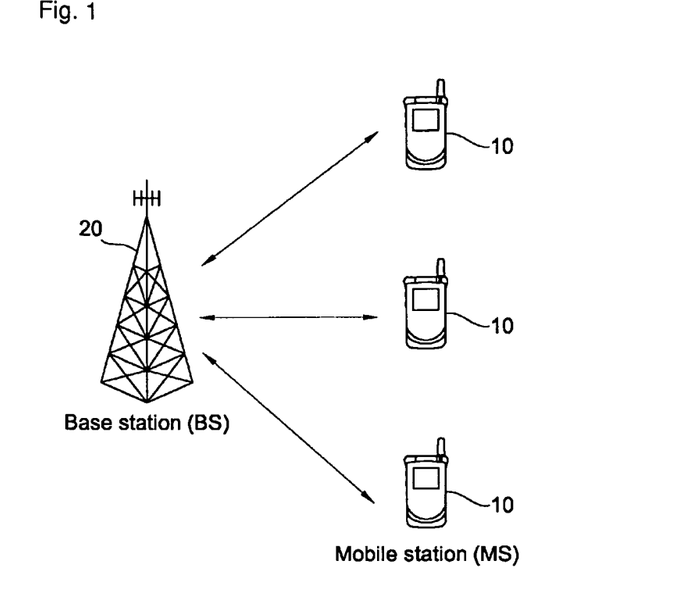
FIG. 1 is a block diagram showing a wireless communication system.

FIG. 1 is a block diagram showing a wireless communication system. Wireless communication systems are widely deployed to provide a variety of communication services, such as voices, packet data, and the like.

Referring to FIG. 1, a wireless communication system comprises a Base Station (BS) 20 and a User Equipment (UE) 10. Generally, the base station 20 is a fixed station communicating with the user equipment 10, which can be referred to as another terminology, such as a node-B, Base Transceiver System (BTS), access point, or the like. One or more cells may be allocated to one base station 20. The user equipment 10 can be fixed or mobile and referred to as another terminology, such as a Mobile Station (MS), a User Terminal (UT), a Subscriber Station (SS), a wireless device, or the like.

Hereinafter, downlink means a communication from the base station 20 to the user equipment 10, and uplink means a communication from the user equipment 10 to the base station 20. In the downlink, a transmitter can be a part of the base station 20, and a receiver can be a part of the user equipment 10. In the uplink, the transmitter can be a part of the user equipment 10, and the receiver can be a part of the base station 20.

Multiple access schemes for the uplink and downlink transmissions may be different from each other. For example, an Orthogonal Frequency Division Multiple Access (OFDMA) may be used for the downlink, and a Single Carrier-Frequency Division Multiple Access (SC-FDMA) may be used for the uplink.

Any multiple access technique may be applied to wireless communication systems. It may be based on a multiple access technique such as Code Division Multiple Access (CDMA), Time Division Multiple Access (TDMA), Frequency Division Multiple Access (FDMA), Single-Carrier FDMA (SC-FDMA), Orthogonal Frequency Division Multiple Access (OFDMA), or other publicized modulation techniques. These modulation techniques demodulate signals received from multiple users of a communication system and therefore increase capacity of the communication system.

Layers of the radio interface protocol between the user equipment 10 and the base station 20 can be classified into L1 layer (a first layer), L2 layer (a second layer), and L3 layer (a third layer) based on the lower three layers of the Open System Interconnection (OSI) model that is well-known in the related art.

Figure 2:
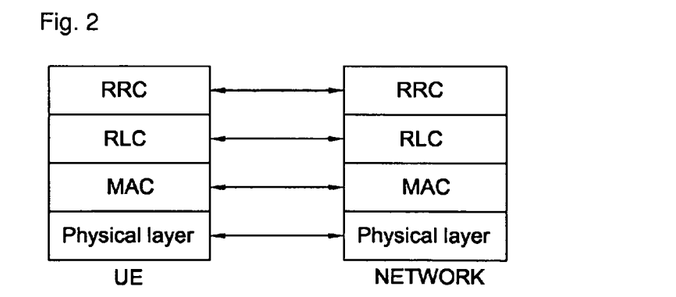
FIG. 2 is a block diagram showing the control plane of a radio interface protocol.
Figure 3:
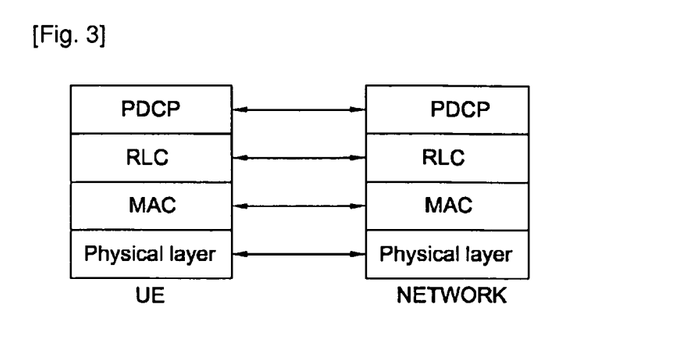
FIG. 3 is a block diagram showing the user plane of a radio interface protocol.

FIG. 2 is a block diagram showing the control plane of a radio interface protocol. FIG. 3 is a block diagram showing the user plane of a radio interface protocol.

Referring to FIGS. 2 and 3, a physical layer is the first layer which offers information transfer services to upper layers on a physical channel. The physical layer is coupled with a Medium Access Control (MAC) layer, i.e., an upper layer of the physical layer, through a transport channel. Data is transferred between the MAC layer and the physical layer through the transport channel. Between different physical layers, i.e., the physical layer of a transmitter and the physical layer of a receiver, data is transferred through the physical channel.

The MAC layer in the second layer provides services to a Radio Link Control (RLC) layer, i.e., an upper layer of the MAC layer, through a logical channel. The RLC layer in the second layer supports reliable data transmission. The unit of data transmitted from the MAC layer is referred to as a Protocol Data Unit (PDU). Data transmitted from the MAC layer to a lower layer is referred to as a MAC PDU.

A Packet Data Convergence Protocol (PDCP) belonging to the second layer performs header compression function. When transmitting an Internet Protocol (IP) packet such as an IPv4 packet or an IPv6 packet, the header of the IP packet may contain relatively large and unnecessary control information. The PDCP layer reduces the header size of the IP packet so as to efficiently transmit the IP packet.

A Radio Resource Control (RRC) layer belonging to the third layer is defined only in the control plane. The RRC layer serves to control the logical channel, the transport channel, and the physical channel in association with configuration, reconfiguration, and release of Radio Bearers (RBs).

A downlink physical channel is classified into a Physical Downlink Shared Channel (PDSCH) to which a DL-SCH is mapped and a Physical Downlink Control Channel (PDCCH) for transmitting control signals. The PDCCH is a downlink control channel through which control information for a Physical Uplink Shared Channel (PUSCH) or the PDSCH is transmitted. An uplink grant that is scheduling information for uplink data transmission and a downlink grant that is scheduling information for downlink data transmission are transmitted through the PDCCH.

The scheduling is a general term referring to a procedure of assigning radio resources and determining a modulation and coding scheme for downlink transmission and uplink transmission.

Hereinafter, disclosed is a method of transmitting HARQ data, in which the base station transmits data, and the user equipment transmits an ACK/NACK signal for the data.

Figure 4:
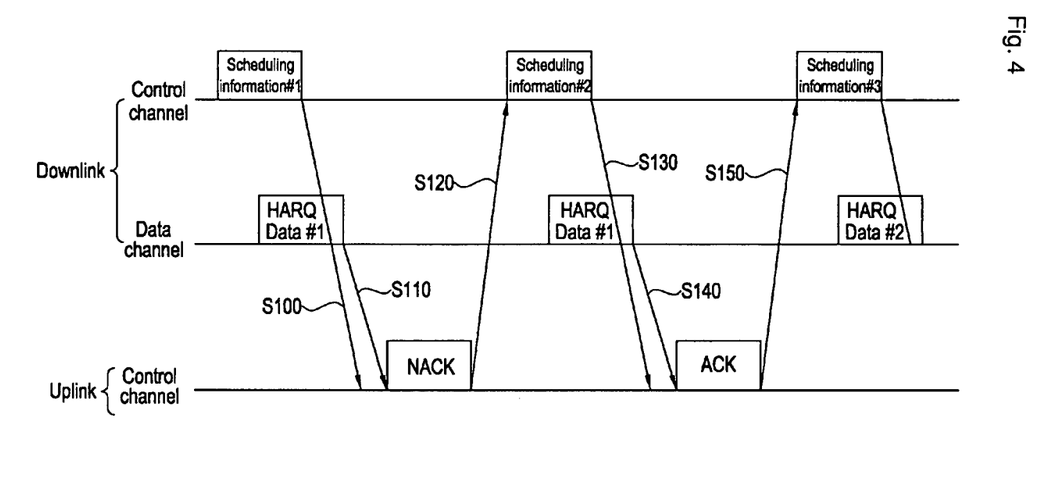
FIG. 4 is a sequence diagram illustrating a method of performing HARQ in downlink transmission according to an embodiment of the present invention.

FIG. 4 is a sequence diagram illustrating a method of performing HARQ in downlink transmission according to an embodiment of the present invention. The figure shows a specific method of implementing HARQ applied to the downlink physical layer of a wireless packet communication system. FIG. 4 shows a case where there is no error in transmission of an ACK/NACK signal for downlink data.

Referring to FIG. 4, a base station transmits scheduling information #1 to a user equipment through the downlink control channel S100. The scheduling information may be referred to as a grant or a scheduling grant. The scheduling information may include at least one of a HARQ channel identification (ID), which is information on a channel for transmitting HARQ data, a New Data Indicator (NDI) for informing of whether the scheduling information is for new HARQ data transmission or for retransmission, and a Redundancy Version (RV) for informing of a retransmission version of the HARQ data.

The HARQ channel ID is sequence information indicating which user equipment performs which HARQ in a set of HARQs when the base station periodically performs the set of HARQs. The HARQ channel ID may be referred to as a HARQ process number. Particularly, since periodic performance of HARQ is not necessarily guaranteed in HARQ of an asynchronous scheme such as downlink transmission, the user equipment first confirms a HARQ channel ID assigned to it and then performs HARQ.

The new data indicator may be bit information of 0 or 1. For example, if the new data indicator is 0, it indicates that the scheduling information is for retransmission, whereas if the new data indicator is 1, it indicates that the scheduling information is for new transmission.

At a time point associated with the scheduling information #1, the base station transmits HARQ data #1 to the user equipment through the downlink data channel S110. The HARQ data is data transmitted in the HARQ scheme as described above, and it is apparent that the terminology of the HARQ data may be replaced with another terminology having the same meaning. The downlink control channel may be a PDCCH, and the downlink data channel may be a PDSCH. The corresponding user equipment knows a format and a transmission time point of data by receiving the downlink control channel and may receive corresponding data. If a user equipment receiving the HARQ data #1 fails to decode the HARQ data #1, the user equipment transmits a NACK signal to the base station S120. The NACK signal may be transmitted through the uplink control channel. At this point, the user equipment may not delete the HARQ data #1 from a HARQ buffer and keep the HARQ data #1 in order to get a diversity effect by combining the HARQ data #1 failed in receiving with HARQ data #1 received successfully in the next.

The base station receiving the NACK signal senses that transmission of the HARQ data #1 to the corresponding user equipment is failed and transmits scheduling information #2 at an appropriate time point S130. Unlike uplink data transmission, the base station transmits scheduling information to the user equipment regardless of whether downlink data transmission is failed or succeeded. Since the base station should retransmit the HARQ data #1, the scheduling information #2 includes a HARQ channel ID that is the same as the HARQ channel ID included in the scheduling information #1. The scheduling information #2 is scheduling information for retransmission of the HARQ data #1 (NDI='0').

The base station retransmits the same HARQ data #1 in the same or a new format S140. The user equipment re-receiving the HARQ #1 may retry decoding the HARQ data #1 by combining the retransmitted HARQ data #1 with the HARQ data #1 that is previously received but failed to be decoded in a variety of ways.

If the user equipment re-receiving the HARQ data #1 successfully decodes the HARQ data #1, the user equipment transmits an ACK signal to the base station S150. The ACK signal may be transmitted through the uplink control channel. The base station receiving the ACK signal senses that the HARQ data #1 is successfully transmitted to the corresponding user equipment and performs a process for transmitting HARQ data #2. A channel for transmitting an ACK/NACK signal is referred to as an ACK/NACK channel.

Figure 5:
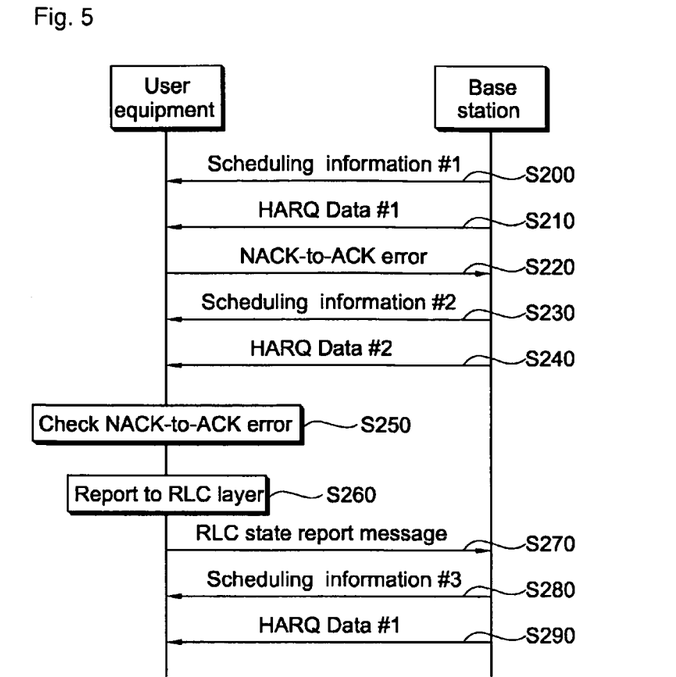
FIG. 5 is a sequence diagram illustrating a method of performing HARQ in consideration of a NACK-TO-ACK error in downlink transmission according to an embodiment of the present invention.

FIG. 5 is a sequence diagram illustrating a method of performing HARQ in consideration of a NACK-TO-ACK error in downlink transmission according to an embodiment of the present invention.

Referring to FIG. 5, the base station transmits scheduling information #1 and then transmits HARQ data #1 to the user equipment S200 and S210. The scheduling information #1 may include at least one of a HARQ channel ID, which is information on a channel for transmitting the HARQ data #1, a new data indicator for informing of whether the scheduling information #1 is for new HARQ data transmission or for retransmission, and a redundancy version for informing of the number of retransmission of the HARQ data #1.

It is assumed that a NACK-TO-ACK error occurs S220. Since the base station receives an ACK signal, not the NACK signal, the base station transmits scheduling information #2 for transmitting new HARQ data #2 S230 and then transmits the HARQ data #2 S240. At this point, the base station does not flush the HARQ data #1 from the HARQ buffer, but keeps the HARQ data #1.

The user equipment checks a NACK-TO-ACK error using the received scheduling information #2 S250. Since the HARQ data #1 should be retransmitted to the user equipment, the user equipment expects to receive scheduling information for retransmission (NDI='0') from the base station. However, when the user equipment decodes the scheduling information #2, the scheduling information #2 includes a new data indicator indicating that the scheduling information #2 is for transmitting new HARQ data (NDI='1'), and thus the user equipment may understand that a NACT-TO-ACK error has occurred.

The user equipment reports the NACT-TO-ACK error to the RLC layer, which is an upper layer S260. Data that cannot be recovered by HARQ may be recovered in the RLC layer. An ARQ procedure is to transmit an RLC status report message to the RLC layer of the base station and receive an RLC status report response message from the RLC layer of the base station, in separation from the HARQ.

The RLC layer of the user equipment transmits an RLC status report message to the base station S270. The RLC layer of the user equipment receiving the NACK-TO-ACK error confirms sequence information of the HARQ data in which a reception error has occurred and transmits an RLC status report message to the base station in order to retransmit HARQ data corresponding to the sequence information. New HARQ data may be received while the NACK-TO-ACK error is transferred to the RLC layer. In this case, the user equipment may transmit an ACK/NAK signal based on a result of a CRC check on the new HARQ data.

The base station transmits scheduling information #3 and retransmits the HARQ data #1 S280 and S290. The scheduling information #3 is scheduling information for retransmission of the HARQ data #1. When the RLC layer of the base station receives the RLC status report response message from the user equipment, it knows that HARQ data corresponding to the sequence information should be retransmitted. Then, the base station flushes the HARQ data #1 from the HARQ buffer.

If the NACK-TO-ACK error is not considered in performing HARQ, the base station receiving an ACK transmits only new HARQ data and does not perform retransmission, and thus loss of data will be occurred. Contrarily, if the NACK-TO-ACK error is considered, although the base station receives an ACK, it does not delete the HARQ data from the HARQ buffer until the NACK-TO-ACK error is clearly identified. Accordingly, when discontinuous HARQ data are transmitted due to a NACK-TO-ACK error, the base station promptly retransmits HARQ data corresponding to an omitted sequence number so that the user equipment may transfer the HARQ data to an upper layer without loss of data.

Figure 6:
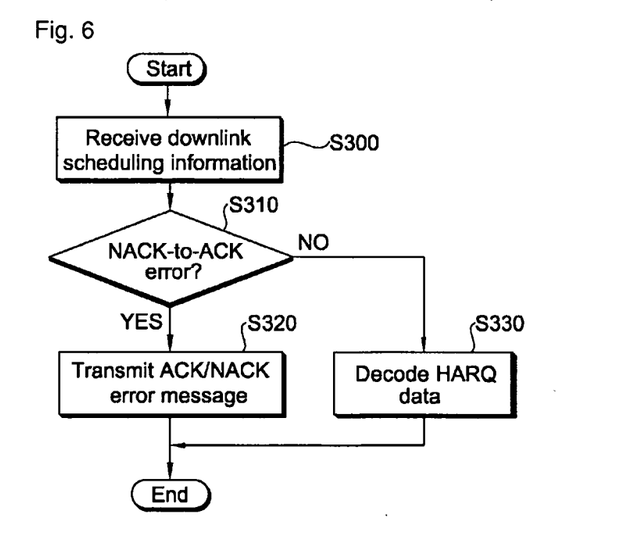
FIG. 6 is a flowchart illustrating a method of performing HARQ by a user equipment in consideration of a NACK-TO-ACK error in downlink transmission according to an embodiment of the present invention.

FIG. 6 is a flowchart illustrating a method of performing HARQ by a user equipment in consideration of a NACK-TO-ACK error in downlink transmission according to an embodiment of the present invention.

Referring to FIG. 6, the user equipment receives scheduling information S300. The scheduling information is also referred to as a downlink grant including information such as a Modulation and Coding Scheme (MCS), resource assignment state, Multiple Input Multiple Output (MIMO), and the like. The downlink grant may be received through a Physical Downlink Control Channel (PDCCH), which is a control channel. The scheduling information may be for new HARQ data or for HARQ data that is the same as previously received HARQ data.

The user equipment checks a NACK-TO-ACK error S310. If an error occurs in the transmission of an ACK/NACK signal as a result of checking the NACK-TO-ACK error, the user equipment regards the ACK signal as a NACK signal and transmits an ACK/NACK error message indicating the result of the check to the base station S320. When an error occurs in the transmission of an ACK/NACK, a method of processing the error may be diversely selected.

According to an example, the ACK/NACK error message may be an RLC status Protocol Data Unit (PDU) processed in the RLC layer. As described above, when some of HARQ data are omitted while the HARQ data are transmitted, the RLC layer of the receiver may transmits an RLC status report message for reporting the omission of HARQ data to the RLC layer of the transmitter.

According to another example, the ACK/NACK error message may be a message transmitted from the MAC layer, which is a lower layer of the RLC layer. This is to further promptly cope with an error recovery.

Since a method of processing the NACK-TO-ACK error is a matter of implementation, there may be a variety of methods other than the method described above.

If an error does not occur in the transmission of an ACK/NACK signal (when the user equipment re-receives HARQ data that is previously received), the user equipment may decode the re-received HARQ data in combination with the HARQ data that is previously received and stored in the HARQ buffer S330.

The scheduling information may include only a new data indicator. Or, the scheduling information may include only a redundancy version. Or, the scheduling information may include both a new data indicator and a redundancy version.

A method of transmitting downlink HARQ data is described so far, in which the base station transmits data to the user equipment, and the user equipment feeds back an ACK/NACK signal related to the data to the base station. Hereinafter, a method of transmitting uplink HARQ data will be described, in which the user equipment transmits data to the base station, and the base station feeds back an ACK/NACK signal related to the data to the user equipment.

Figure 7:
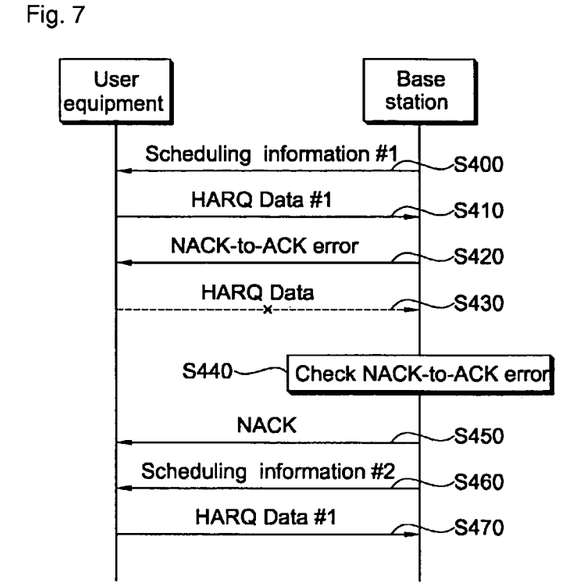
FIG. 7 is a sequence diagram illustrating a method of performing HARQ in consideration of a NACK-TO-ACK error in uplink transmission according to an embodiment of the present invention.

FIG. 7 is a sequence diagram illustrating a method of performing HARQ in consideration of a NACK-TO-ACK error in uplink transmission according to an embodiment of the present invention.

Referring to FIG. 7, the base station transmits scheduling information #1 to the user equipment S400, and the user equipment transmits HARQ data #1 to the base station based on the scheduling information #1 S410. The scheduling information #1 may be an uplink grant including information such as an MCS, resource assignment state, MIMO, and the like of the user equipment. The scheduling information #1 may include at least one of a New Data Indicator (NDI) for indicating whether the scheduling information is for new transmission or for retransmission, and a Redundancy Version (RV) for informing of the number of retransmission of the HARQ data.

It is assumed that a NACK-TO-ACK error occurs S420. If there is a CRC error in uplink HARQ data, the base station may transmits scheduling information while transmitting a NACK signal. However, in order to reduce an overhead incurred by the control information, the base station may not explicitly transmit scheduling information for the user equipment to retransmit the HARQ data.

Although the user equipment receives an ACK signal, it does not flush the HARQ data #1 stored in the HARQ buffer. That is, the user equipment does not empty the HARQ buffer. It is since that when a NACK-TO-ACK error is found, the user equipment should retransmit the previous HARQ data #1.

Since the user equipment has received an ACK signal, it expects scheduling information #2 for transmission of new HARQ data #2. However, when the base station transmits a NACK signal, the base station does not transmit new scheduling information to the user equipment, but allows the user equipment to transmit HARQ data based on the previous scheduling information. If the scheduling information is an uplink grant, the uplink grant may be transmitted through a PDCCH. If an uplink grant is not assigned to the user equipment when the user equipment successfully decodes the PDCCH, the user equipment does not transmit any HARQ data, but waits S430.

The base station checks a NACK-TO-ACK error S440. If the user equipment retransmits the HARQ data #1 for the NACK transmitted by the base station, the base station may determine that there is no error. Contrarily, if the user equipment does not retransmit the HARQ data #1, the base station may determine that there is a NACK-TO-ACK error.

There may be a variety of methods for determining NACK-TO-ACK error. As an example, NACK-TO-ACK error may be determined by measuring an energy level of a received signal from the user equipment for a certain period of time. If the measured value of the received signal is lower than a predetermined threshold value for a certain period of time, the base station may determine NACK-TO-ACK error. This is a matter of implementation, and the method of checking a NACT-TO-ACK error may be accomplished in a variety of ways. The present invention is not limited to determining a NACK-TO-ACK error using whether HARQ data is received.

If the base station determines NACK-TO-ACK error, it may retransmit a NACK signal S450. It is apparent that whether the base station retransmits a NACK signal is optional. The base station transmits scheduling information #2 for retransmission of the HARQ data #1 (NDI='0') S460. Since the scheduling information #2 is for retransmission of the HARQ data #1, the user equipment may know that there is a NACK-TO-ACK error. Accordingly, the user equipment retransmits the HARQ data #1 stored in the HARQ buffer based on the scheduling information #2 S470.

The scheduling information #1 and #2 may include only a new data indicator. Or, the scheduling information #1 and #2 may include only a redundancy version. Or, the scheduling information #1 and #2 may include both a new data indicator and a redundancy version.

Figure 8:
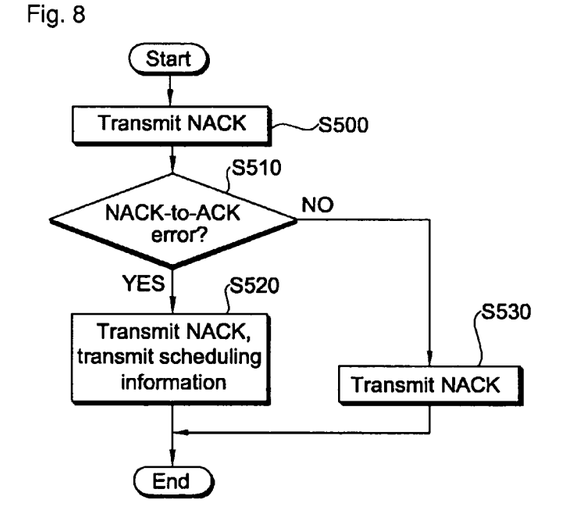
FIG. 8 is a flowchart illustrating a method of performing HARQ by a base station in consideration of a NACK-TO-ACK error in uplink transmission according to an embodiment of the present invention.

FIG. 8 is a flowchart illustrating a method of performing HARQ by a base station in consideration of a NACK-TO-ACK error in uplink transmission according to an embodiment of the present invention.

Referring to FIG. 8, the base station that does not properly decode HARQ data transmits a NACK signal to the user equipment S500. The base station checks a NACK-TO-ACK error using HARQ data received from the user equipment S510. If there is a NACK-TO-ACK error (that is, if the signal value of the HARQ data is measured to be lower the a threshold value), the base station retransmits a NACK signal and transmits scheduling information for retransmission of the HARQ data to the user equipment S520.

Figure 9:
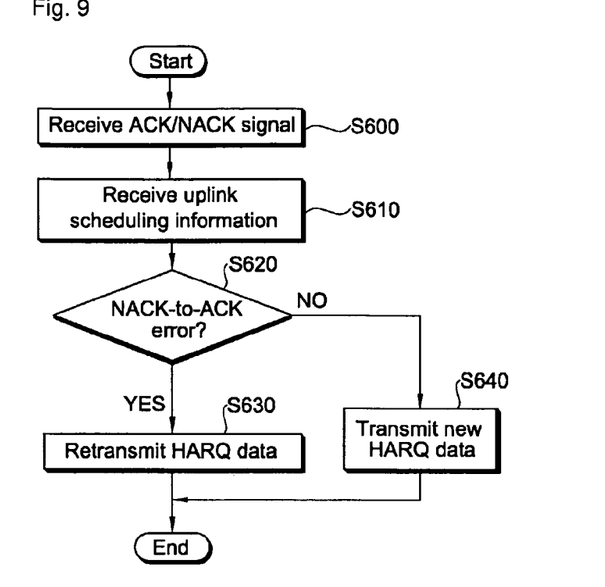
FIG. 9 is a flowchart illustrating a method of performing HARQ by a user equipment in consideration of a NACK-TO-ACK error in uplink transmission according to an embodiment of the present invention.

FIG. 9 is a flowchart illustrating a method of performing HARQ by a user equipment in consideration of a NACK-TO-ACK error in uplink transmission according to an embodiment of the present invention.

Referring to FIG. 9, the user equipment receives an ACK/NACK signal S600. The user equipment could not know whether there is an error in the ACK/NACK signal. Therefore, the user equipment does not empty the HARQ buffer, but keeps the HARQ data previously transmitted and stored in the HARQ buffer. Then, the user equipment waits until scheduling information is received from the base station.

The user equipment receives scheduling information S610. The scheduling information may be an uplink grant including an MCS, resource assignment state, MIMO, and the like of the user equipment. When the scheduling information includes a new data indicator, the user equipment may know whether the scheduling information is for new transmission or retransmission through the new data indicator.

The user equipment checks a NACK-TO-ACK error S620. The user equipment checks the NACK-TO-ACK error to determine whether or not a HARQ entity of the user equipment to perform retransmission. That is, if there is a NACK-TO-ACK error, the user equipment performs retransmission, whereas if there is no NACK-TO-ACK error, the user equipment performs new transmission.

If the HARQ buffer is not empty or the scheduling information is for retransmission, the HARQ entity instructs a HARQ process to perform retransmission S630. That is, the HARQ entity instruct the HARQ process to perform retransmission without considering an ACK/NACK signal, but considering the new data indicator of the scheduling information and a state of the HARQ buffer. The HARQ process has the Number of Current Transmission (NCT), which is the number of transmission taken place for the HARQ data currently stored in the HARQ buffer, and increments the NCT by one whenever an instruction for performing retransmission is received from the HARQ entity.

On the other hand, if neither the ACK/NACK signal is an ACK signal nor the scheduling information is for retransmission, the HARQ process performs retransmission depending on the instruction from the HARQ entity.

If the scheduling information is for new transmission, the HARQ entity instructs the HARQ process to perform new transmission depending on the scheduling information S640.

On the other hand, if the base station does not detects a signal for new HARQ data transmitted from the user equipment although the base station has transmitted scheduling formation for new transmission after transmitting an ACK signal, the base station may terminates a corresponding HARQ process and retransmit scheduling information for new transmission, instead of scheduling information for retransmission of the previously received HARQ data.

Figure 10:
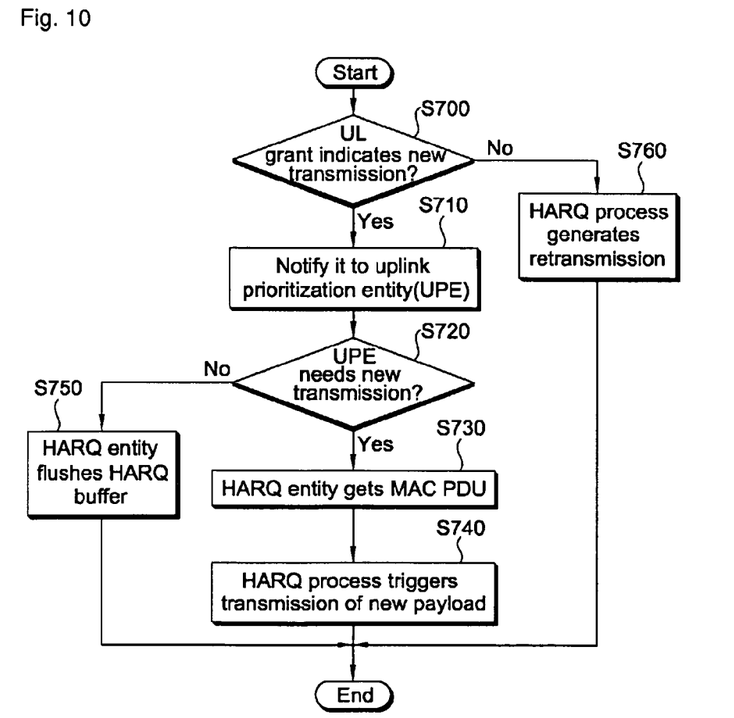
FIG. 10 is a flowchart illustrating a method of performing HARQ by a user equipment in consideration of a NACK-TO-ACK error in uplink transmission according to another embodiment of the present invention.

FIG. 10 is a flowchart illustrating a method of performing HARQ by a user equipment in consideration of a NACK-TO-ACK error in uplink transmission according to another embodiment of the present invention. Here, the scheduling information may be an uplink grant indicating information such as resource assignment, modulation, coding, and the like needed for the user equipment to perform uplink transmission. The uplink grant is scheduled to be transmitted to the user equipment during every Transmission Time Interval (TTI) through a PDCCH or transmitted as a random access response. The random access response is a response to a random access request transmitted by the user equipment to the base station through a Random Access Channel (RACH) in an initial stage for connecting to the base station.

When the uplink grant is indicated for every given TTI, the HARQ entity of the user equipment identifies a HARQ process in which data transmission takes place.

Referring to FIG. 10, the HARQ entity of the user equipment determines whether the scheduling information is for new transmission S700. If the base station transmits scheduling information for new transmission to the user equipment, it means that the base station fed back an ACK signal for the HARQ data previously transmitted by the user equipment. Contrarily, if the base station does not separately transmit scheduling information or transmits scheduling information for retransmission to the user equipment (i.e., no uplink grant or an uplink grant for retransmission), it means that a NACK signal for the HARQ data previously transmitted by the user equipment is fed back to the user equipment by the base station.

If the scheduling information is for new transmission, the user equipment notifies it to an Uplink Prioritization Entity (UPE) S710. The HARQ entity checks whether the UPE indicates transmission of new HARQ data during the given TTI S720.

If the UPE indicates that transmission of new HARQ data is needed, the HARQ entity obtains a MAC PDU to be transmitted, from a multiplexing and assembly entity S730. The HARQ entity directs the HARQ process corresponding to the given TTI to generate transmission of a new payload using identified parameters S740.

If the UPE does not indicate that transmission of new HARQ data is needed, the HARQ entity flushes the HARQ buffer that stores the HARQ data S750.

If the scheduling information does not indicates transmission of new data, and then the user equipment receives scheduling information for retransmission or a HARQ buffer of a HARQ process for the given TTI is not empty with HARQ data, the HARQ entity directs the HARQ process to generate retransmission S760.

Here, the reason that the HARQ data is not flushed from, but kept in the HARQ buffer is described below. If an ACK signal is fed back during the immediately previous TTI, but no uplink grant is received during the next TTI or the uplink grant is for retransmission, the user equipment may determine that a NACK-TO-ACK error has occurred. Considering the possibility of such an NACK-TO-ACK error, the HARQ process does not flush the HARQ buffer and keeps the HARQ data. Accordingly, the HARQ process does not empty the HARQ buffer although an ACK is received during every TTI and determines an NACK-TO-ACK error based on the uplink grant of the immediately next TTI. The HARQ process performs retransmission of the HARQ data or flushes the HARQ buffer based on the determination of such an NACK-TO-ACK error.

Figure 11:
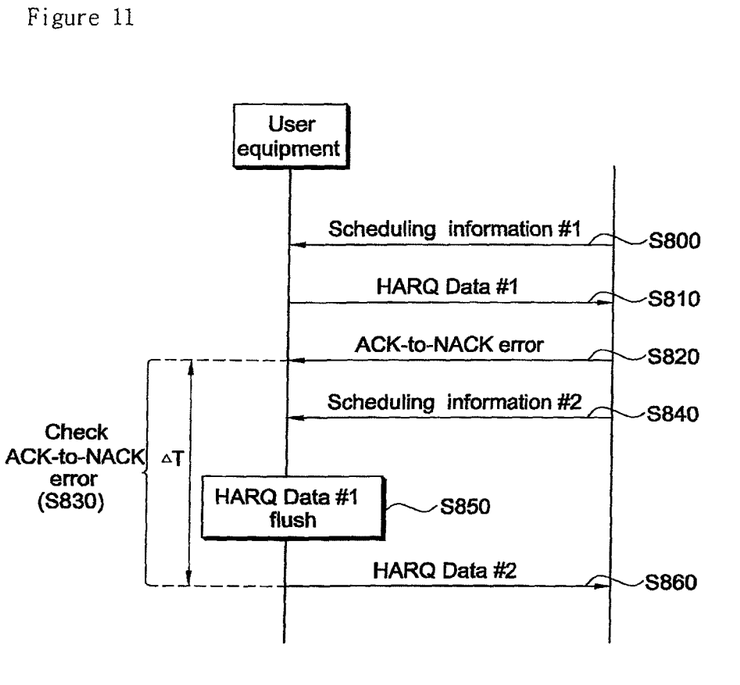
FIG. 11 is a sequence diagram illustrating a method of performing HARQ in consideration of an ACK-TO-NACK error in uplink transmission according to another embodiment of the present invention.

FIG. 11 is a sequence diagram illustrating a method of performing HARQ in consideration of an ACK-TO-NACK error in uplink transmission according to another embodiment of the present invention.

Referring to FIG. 11, the base station transmits scheduling information #1 to the user equipment S800. The user equipment transmits HARQ data #1 to the base station based on the scheduling information #1 S810. It is assumed that an ACK-TO-NACK error occurs S820. Since the user equipment could not know whether there is an error in an ACK/NACK signal, the user equipment does not empty the HARQ buffer, but keeps the HARQ data #1 stored in the HARQ buffer.

The user equipment checks an ACK-TO-NACK error S830. The ACK-TO-NACK error may be checked by determining whether new scheduling information #2 is received from the base station within a certain period of time ΔT. Here, the certain period of time ΔT may be a transmission time interval (TTI). As an example, the TTI may be defined as a time period during which data is arrived at a coding/multiplexing unit in the form of a set of transport blocks, such as 10 ms, 20 ms, 40 ms, or 80 ms. As another example, the TTI may be defined as a time period during which a subframe is transmitted.

The user equipment storing the HARQ data #1 waits for the certain period of time ΔT, until scheduling information #2 for transmission of new HARQ data #2 is received. However, when the base station transmits an ACK signal, it may separately transmit new scheduling information #2 to the user equipment so that the user equipment may transmit new HARQ data #2. Therefore, if the scheduling information #2 which is for new data transmission is transmitted from the base station within the certain period of time ΔT (which is a case where the base station actually transmits an ACK signal although the user equipment receives a NACK signal), the user equipment determines that an ACK-NACK error has occurred and flushes the HARQ data #1 stored in the HARQ buffer S840. The user equipment transmits HARQ data #2 to the base station based on the scheduling information #2 S850.

Figure 12:
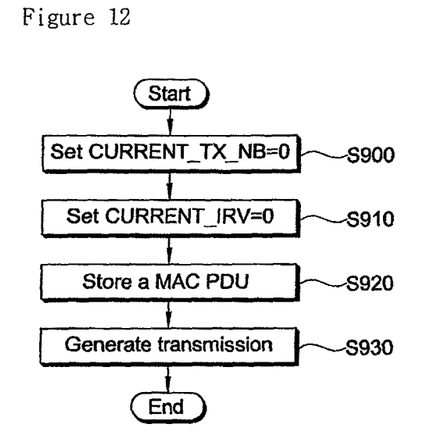
FIG. 12 is a flowchart illustrating an operation of a HARQ process of a user equipment when a HARQ entity provides new HARQ data according to an embodiment of the present invention.

FIG. 12 is a flowchart illustrating an operation of a HARQ process of a user equipment when a HARQ entity provides new HARQ data according to an embodiment of the present invention.

Referring to FIG. 12, if a HARQ process is determined, the NCT is initialized to 0 S900. Each HARQ process maintains an NCT. The HARQ entity sets a current incremental redundancy version (CURRENT_IRV) to 0 S910. The HARQ entity stores a MAC PDU in an associated HARQ buffer S920. The HARQ process generates transmission of HARQ data with respect to the MAC PDU S930.

Figure 13:
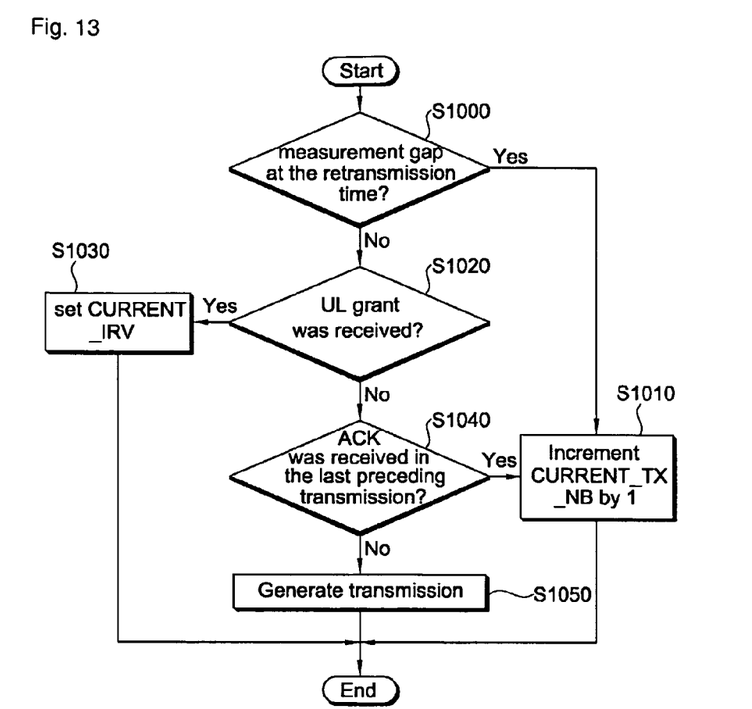
FIG. 13 is a flowchart illustrating an operation of a HARQ process of a user equipment when a HARQ entity directs retransmission according to an embodiment of the present invention.

FIG. 13 is a flowchart illustrating an operation of a HARQ process of a user equipment when a HARQ entity directs retransmission according to an embodiment of the present invention.

Referring to FIG. 13, the HARQ process determines whether a measurement gap exists at the retransmission time S100. If a measurement gap exists, the HARQ process increases the NCT by one S1010. Here, the user equipment is set to the maximum number of transmission that is commonly applied to all logical channels and HARQ processes. If the NCT becomes equal to the maximum number of transmission, the HARQ process flushes the HARQ buffer.

If a measurement gap does not exist, the HARQ process determines whether scheduling information for retransmission is received on a PDCCH S1020. If scheduling information is received, the HARQ process sets the current incremental redundancy version (CURRENT_IRV) as indicated by the scheduling information S1030. The HARQ process generates transmission of HARQ data S1050.

If scheduling information is not received, the HARQ process determines whether an ACK signal is received for the same data transmitted during the immediately previous TTI S1040. If an ACK signal is received for the same data transmitted during the immediately previous TTI, the NCT is increased by 1 S1010. If an ACK signal is not received for the same data transmitted during the immediately previous TTI, the HARQ process generates transmission of HARQ data S1050.

Since the HARQ entity of the user equipment could not know whether there is an error in an ACK/NACK signal, the user equipment does not flush the HARQ buffer, but keeps the HARQ data stored in the HARQ buffer although an ACK signal is received. It is since that when the ACK signal is identified to be a NACK-TO-ACK error, the user equipment should retransmit the previous HARQ data. That is, although an ACK signal is received, the user equipment temporarily suspends uplink transmission considering the possibility of the ACK signal to be a NACK signal (at this point, the HARQ buffer is not flushed). On the other hand, the user equipment adaptively determines whether to retransmit HARQ data by consistently monitoring whether reception of scheduling information, a target indicated by the scheduling information, and the like, and thus further stable data transmission may be accomplished.

Figure 14:
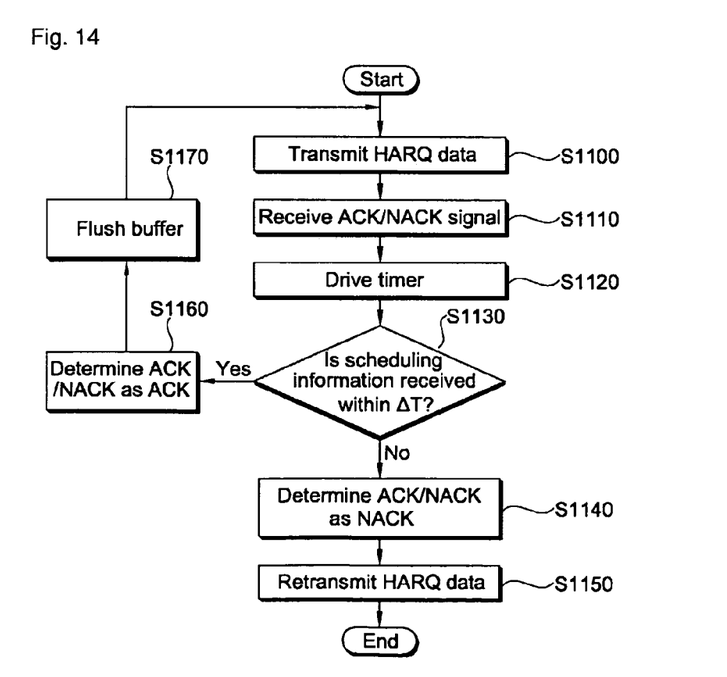
FIG. 14 is a flowchart illustrating a method of performing a HARQ process in uplink transmission according to an embodiment of the present invention.

FIG. 14 is a flowchart illustrating a method of performing a HARQ process in uplink transmission according to an embodiment of the present invention.

Referring to FIG. 14, the user equipment transmits HARQ data to the base station S1100. The user equipment receives an ACK/NACK signal for the HARQ data from the base station S1110. The user equipment drives a timer S1120. After driving the timer, the user equipment determines whether scheduling information is received within a certain period of time ΔT S1130. If scheduling information is not received within the certain period of time ΔT, the user equipment determines the ACK/NACK signal as a NACK signal S1140. If the ACK/NACK signal is determined as a NACK signal, the user equipment retransmits the HARQ data S1150.

If scheduling information is received within the certain period of time ΔT, the user equipment determines the ACK/NACK signal as an ACK signal S1160. If the ACK/NACK signal is determined as an ACK signal, the user equipment flushes the HARQ data stored in the HARQ buffer S1170 and transmits HARQ data based on the new scheduling information.

All the functions described above may be performed by a processor such as a microprocessor, controller, microcontroller, Application Specific Integrated Circuit (ASIC), or the like operated based on software, a program code, or the like coded to perform the functions. A design, development, and implementation of the code will be apparent to those skilled in the art based on the descriptions of the present invention.

Although the present invention has been described with reference to several preferred embodiments, the description is illustrative of the invention and is not to be construed as limiting the invention. Various modifications and variations may occur to those skilled in the art, without departing from the scope of the invention as defined by the appended Claims.

The invention claimed is:

1. A method of data transmission using a hybrid automatic repeat request (HARQ) scheme performed by a transmitter, the method comprising:
 transmitting data to a receiver;
 receiving an acknowledgement (ACK) signal for the data from the receiver;
 determining whether or not an uplink grant associated with the ACK signal is received; and
 keeping the data in a HARQ buffer if it is determined that the uplink grant associated with the ACK signal is not received within a certain time period from the receiver,
 wherein, if retransmission is requested, the transmitter determines whether a measurement gap exists at retransmission time, and
 wherein a number of current transmissions is incremented by one if the retransmission is requested.

2. The method of claim 1, wherein the uplink grant is transmitted on a physical downlink control channel (PDCCH).

3. The method of claim 1, wherein the data is a medium access control protocol data unit (MAC PDU).

4. The method of claim 1, wherein the uplink grant comprises a new data indicator (NDI), the NDI indicating retransmission.

5. The method of claim 1, wherein if the uplink grant is received, an incremental redundancy version is set as indicated by the uplink grant.

6. The method of claim 1, further comprising:
 flushing the HARQ buffer if the number of current transmissions is determined to be equal to a maximum number of transmissions of the data.

7. The method of claim 6, further comprising:
 setting the maximum number of transmissions for all logical channels and HARQ processes.

8. The method of claim 1, further comprising:
 initializing the number of current transmissions to zero after a HARQ process is determined.

9. The method of claim 1, wherein the transmitter flushes the data if it is determined that the uplink grant associated with the ACK signal is received from the receiver.

10. The method of claim 1, wherein the certain time period is a transmission time interval (TTI).

11. A transmitter for data transmission using a hybrid automatic repeat request (HARQ) scheme, the transmitter comprising:
 a radio unit configured to:
  transmit data to a receiver;
  receive an acknowledgement (ACK) signal for the data from the receiver;
  determine whether or not an uplink grant associated with the ACK signal is received; and
  keep the data in a HARQ buffer if it is determined that the uplink grant associated with the ACK signal is not received within a certain time period from the receiver,
 wherein, if retransmission is requested, the radio unit determines whether a measurement gap exists at retransmission time, and
 wherein a number of current transmissions is incremented by one if the retransmission is requested.

12. The transmitter of claim 11, wherein the data is a medium access control protocol data unit (MAC PDU).

13. The transmitter of claim 11, wherein if the uplink grant is received, an incremental redundancy version is set as indicated by the uplink grant.

14. The transmitter of claim 11, wherein the radio unit is further configured to flush the HARQ buffer if the number of current transmissions becomes equal to a maximum number of transmissions of the data.

15. The transmitter of claim 14, wherein the radio unit is further configured to set the maximum number of transmissions that is applied to all logical channels and HARQ processes.

16. The transmitter of claim 11, wherein the radio unit is further configured to initialize the number of current transmissions to zero after a HARQ process is determined.

17. The transmitter of claim 11, wherein the radio unit flushes the data if it is determined that the uplink grant associated with the ACK signal is received from the receiver.

18. The transmitter of claim 11, wherein the certain time period is a transmission time interval (TTI).

* * * * *